United States Patent [19]

Brandon et al.

[11] 4,325,563

[45] Apr. 20, 1982

[54] VEHICLE SPRAY REDUCTION

[76] Inventors: Ronald E. Brandon, 1734 Lenox Rd., Schenectady, N.Y. 12308; James W. Winger, 5728 E. Glen Carla Dr., Huntington, W. Va. 25705

[21] Appl. No.: 146,013

[22] Filed: May 2, 1980

[51] Int. Cl.³ .......................................... B62D 25/16
[52] U.S. Cl. ........................................ 280/154.5 R
[58] Field of Search ................ 280/152 R, 154.5 R, 280/154.5 A, 155, 153 R

[56] References Cited

U.S. PATENT DOCUMENTS

| | | | |
|---|---|---|---|
| 3,922,003 | 11/1975 | Lea | 280/154.5 R |
| 4,192,522 | 3/1980 | Morgan | 280/154.5 R |
| 4,205,861 | 6/1980 | Roberts et al. | 280/154.5 R |

*Primary Examiner*—Joseph F. Peters, Jr.
*Assistant Examiner*—Michael Mar

[57] ABSTRACT

An apparatus for collecting wet spray from the tires of vehicle trucks operating on wet roads comprising a plurality of vertical, parallel wiggle plates having curved air flow passages for separating the water droplets from the air.

2 Claims, 3 Drawing Figures

VEHICLE SPRAY REDUCTION

REFERENCES CITED: U.S. Pat. No. 2,831,702—1958—Eaves and Robenchaud, U.S. Pat. No. 2,844,388—1958—Rheeling, U.S. Pat. No. 1,759,793—1930—Lund.

This invention relates to the art of preventing harmful and dangerous spray normally developed by truck and trailer wheels on wet roads.

High speed trucks, trailers, and other vehicles frequently employ wheels which are normally provided with mud flaps to minimize their tendency to throw spray, rocks, mud, etc. toward following vehicles. Unfortunately, due to a combination of complicated air flow and water droplet patterns, these vehicles produce a cloud of mist to both sides and to the rear when operating on wet roads that cause serious and dangerous visual obstruction to nearby vehicles, especially in passing situations.

The basic flow problem is that the motion of the truck itself produces a high relative velocity field sweeping toward the rear of the vehicle. This relative flow field rushes toward the wheels and mud flaps and is forced to both sides of these comparatively blunt objects. The flow is generally forced more to the outside of the vehicle due to the axle support mechanisms and trailer base beams that obstruct flow deflection to the inside of the wheel area. Thus it is seen that the wheel and mud flap area is a zone where sideways air currents occur. Dual wheels and multiaxles complicate this flow condition.

On wet roads, the wheels pick up and throw finely divided water droplets in a nearly full radial plane. These droplets impact against the underside of the vehicle and against the mud flaps where further atomization occurs and the turbulent air currents described above pick up the fine spray and disperse it to both sides as well as to the rear. In general, the smaller the water droplets are atomized, the more lasting and obstructing will be the clouds of spray that are created.

The foregoing undesirable aspects of current arrangements are advantageously overcome in accordance with the present invention.

In this respect the present invention in its broadest sense applies to wheeled vehicles operating on wet roads and provides a system that improves several aspects of water droplet size and dispersion. This is accomplished by employing one or both of the following two systems:

A mist eliminator mounted outside the plane of the wheels and extending upward to the body of the trailer or vehicle. The location is specially selected to coincide with those areas where atomized water droplets are carried by air currents to the side of said vehicle. The mist-eliminator is designed to permit air currents to flow relatively freely through while moisture droplets are caught, then directed to relatively harmless areas.

A combination mud flap and mist eliminator located behind the wheels to permit air to pass through yet stop water droplets and particles.

With this arrangement the finely atomized water droplets are stopped from being dispersed so as to obscure the vision of other vehicles and are drained in relatively large stable drops to areas where minimum subsequent disturbance will occur.

Accordingly, one purpose of this invention is to reduce or prevent the sideways and backward flowing spray cloud that issues from trucks and trailers when operating on wet roads.

A further object of this invention is to reduce the fine spray dispersion of water droplets and consequently reduce the size, longevity, and obscuring capability of the spray cloud issued by trucks and trailers.

Still another object of this invention is to reduce the portion of the spray that is deflected to the outside of trucks and trailers.

Another object of this invention is to collect portions of the water thrown by the truck or trailer wheels and discharge it in a location and manner to decrease the obscuring spray cloud.

Another object is the reduction of aerodynamic drag of current wheel and mud flap arrangments.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings, of which:

Figure 1:
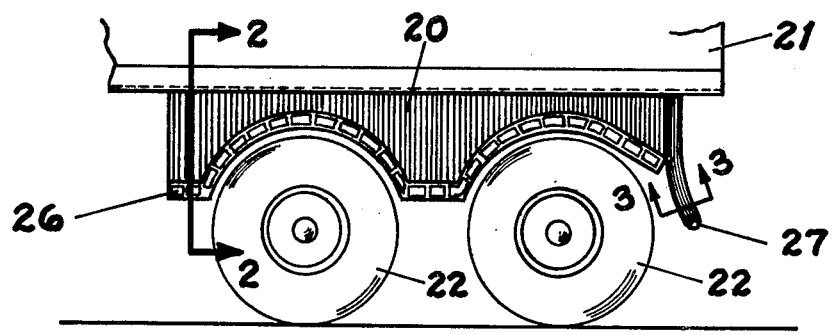
FIG. 1 is a side view, of a truck-type vehicle illustrating both the side mounted mist eliminator and the combined mud flap-mist eliminator mounted behind the wheels.
Figure 2:
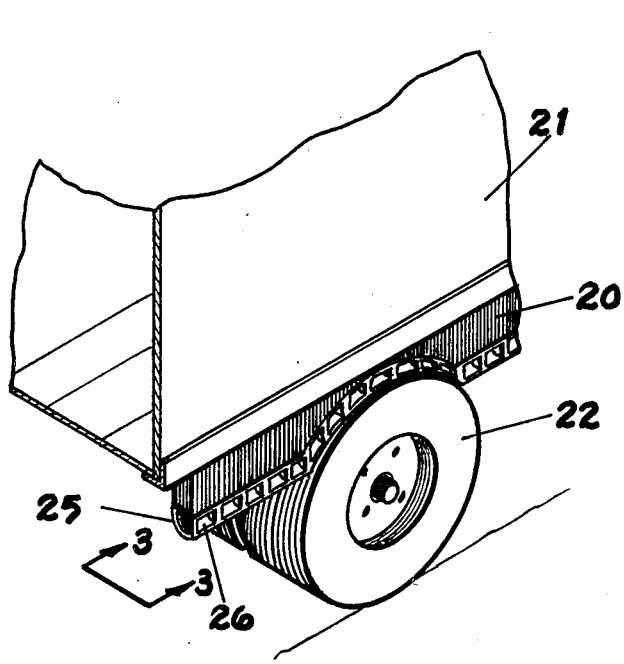
FIG. 2 is an enlarged fragmentary sectional view taken along line 22 of the side mounted mist eliminator shown in FIG. 1.

While the invention is illustrated with the dual rear wheels of a trailer, it is to be understood to be usable in other locations and with other types of vehicles.

Referring to the drawings in detail, there is illustrated the wheel area of a trailer or truck. The side mounted mist eliminators 20 are mounted under the body of the trailer 21 and outside of the plane of the wheels 22. The mist eliminators 22 are comprised of flow passages that permit air to pass but only through a series of turns that separates the water droplets from the air so that the mist is mostly stopped and prevented from obscuring the vision of other vehicles. The mist eliminator illustrated employs a series of wiggle plates, 23. The moisture is separated from the air and flows downward by the force of gravity in the vicinity of the water cavities, 24.

The water can drain freely out the bottom of the wiggle plates to the outside of the wheels or can be drained into a gutter 25, with openings 26 to direct the flow to the rear and side of the wheels. Gutter 25 can also provide support and stiffening for the individual plates 23, as well as a deflector to contain water thrown radially by the wheel 22 within the wheel cavity.

Figure 3:
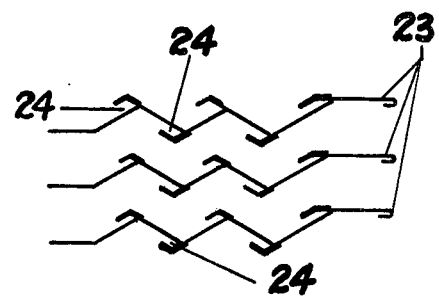
FIG. 3 is an enlarged fragmentary sectional view taken along line 3—3 of FIG. 1 or line 3—3 of FIG. 2, showing details of the flow passages of the mist eliminator.

The combined mud flap-moisture separator is likewise comprised of moisture separating plates such as illustrated in FIG. 3. Airflow is free to pass through while water droplets are separated. The separated water flows downward in the vicinity of cavities 24, to be discharged at the bottom of the flap either directly or by way of a gutter 27 that guides the flow either to the inside or outside, away from the wheel plane.

It should be noted that the mist eliminators can be comprised not only of the wiggle plates illustrated but also of a mesh or of other passages that cause the flow to be rapidly turned to separate the water from the air.

The mesh causes the water droplets to join one-another, thus growing in size and draining out the bottom.

It should also be noted that the profile of the lower edge of part 20 can be formed curved to fit the shape of the wheels as illustrated or made more or less straight to simplify the design while still capturing the largest portion of the mist carrying air flow which is strongest in the area immediately adjacent to the bottom of the trailer. The mist eliminator should permit air to flow with a minimum pressure drop otherwise the air, with its atomized water droplets will bypass the mist eliminator and escape to produce obscuring clouds.

While what has been described is felt to be the preferred embodiment of the invention, other modifications will occur to those skilled in the art, and it is of course desired to cover in the appended claims all such modifications as fall within the true spirit and scope of the invention.

What we claim as new and desire to secure by Letters Patent of the United States is:

1. An apparatus for collecting wet spray from the tires of vehicle trucks operating on wet roads comprising a plurality of wiggle plates adapted to be mounted on the underside of a vehicle truck body along its lateral edge above the vehicle tires, said wiggle plate comprising a plurality of vertical plates which are mounted transversely with respect to the centerline of the vehicle axis, each of said wiggle plates having a plurality of angular bends and a vertical member secured to the plate at each bend to form a water cavity, wherein said wiggle plates are mounted in a parallel relationship to form therebetween flow passages having a plurality of curved turns for separating the water droplets in the air flowing transversely outward from the truck centerline in the vicinity of the tires through said flow passages and collecting the water droplets at each turn in said water cavity, and a gutter mounted at the bottom of said wiggle plates for collecting water from said water cavities, said gutter having openings for discharging the collected water to the rear and side of the vehicle.

2. An apparatus for collecting wet spray according to claim 1 including a plurality of wiggle plates mounted behind the wheels of the vehicle, the flow passages between said plates being parallel with the plane of the vehicle tires to permit the air flowing rearwardly to pass freely through said passages with water droplets carried by the air or thrown by the tires to be collected and permitted to drain downwardly by the influence of gravity.

* * * * *